United States Patent
Rubio

(10) Patent No.: US 11,414,351 B2
(45) Date of Patent: Aug. 16, 2022

(54) SEAMIX: BASALT AND GRAPHENE INFUSED CONCRETE ADMIXTURE FOR PREPARING CEMENTITIOUS COMPOSITION WITH NON-POTABLE WATER

(71) Applicant: Rey J. Rubio, Miami, FL (US)

(72) Inventor: Rey J. Rubio, Miami, FL (US)

( * ) Notice: Subject to any disclaimer, the term of this patent is extended or adjusted under 35 U.S.C. 154(b) by 0 days.

(21) Appl. No.: 17/083,721

(22) Filed: Oct. 29, 2020

(65) Prior Publication Data

US 2022/0135480 A1 May 5, 2022

(51) Int. Cl.

| | |
|---|---|
| *C04B 28/04* | (2006.01) |
| *C04B 20/00* | (2006.01) |
| *C04B 14/46* | (2006.01) |
| *C04B 14/02* | (2006.01) |
| *C04B 22/14* | (2006.01) |
| *C04B 22/12* | (2006.01) |
| *C04B 22/06* | (2006.01) |
| *C04B 18/14* | (2006.01) |
| *C04B 14/10* | (2006.01) |

(52) U.S. Cl.
CPC ............ *C04B 28/04* (2013.01); *C04B 14/026* (2013.01); *C04B 14/10* (2013.01); *C04B 14/4668* (2013.01); *C04B 18/146* (2013.01); *C04B 20/0068* (2013.01); *C04B 22/066* (2013.01); *C04B 22/124* (2013.01); *C04B 22/14* (2013.01); *C04B 2201/50* (2013.01)

(58) Field of Classification Search
CPC ... C04B 14/10; C04B 14/026; C04B 14/4668; C04B 18/146; C04B 20/0068; C04B 22/14; C04B 22/066; C04B 22/124; C04B 28/04; C04B 2201/50

See application file for complete search history.

(56) References Cited

FOREIGN PATENT DOCUMENTS

| | | | | |
|---|---|---|---|---|
| CN | 105036570 A | * | 11/2015 | |
| CN | 105541208 A | * | 5/2016 | |
| CN | 107200867 A | * | 9/2017 | |
| JP | 05286747 A | * | 11/1993 | ......... C04B 14/4668 |

OTHER PUBLICATIONS

Afroz et al, "Chemical durability and performance of modified basalt fiber in concrete medium", Construction and Building Materials 154, pp. 191-203. (Year: 2017).*

Grzeszczyk et al., "Reactive Powder Concrete Containing Basalt Fibers: Strength, Abrasion and Porosity", Materials 2020, 13, 2948; pp. 1-21, http://www.mdpi.com/journal/materials, doi:10.3390/ma13132948. (Year: 2020).*

* cited by examiner

*Primary Examiner* — Anthony J Green
(74) *Attorney, Agent, or Firm* — Nicole Fundora

(57) ABSTRACT

An admixture for making a high-strength concrete with any type of water, including potable water, freshwater, saltwater, brackish water, reclaimed water or any other non-potable water. The admixture consists of basalt fibers, graphene nanoplatelets, calcium sulfide, calcium chloride, magnesium oxide and nanoclays. The admixture can be added to the cement to supplement it to increase the overall compressive strength, or the amount of cement used can be reduced by the amount of admixture added to shorten cure times. A concrete mix can also be prepared by replacing the calcium chloride with silica fume, reducing the amount of cement used, and introducing locally sourced aggregates, coarse and fine, to yield Ultra High Performance Concrete. Products made from the concrete incorporating the admixture have increased compression strength, improved cure times, reduced water consumption and corrosion, increased durability and workability, drastically reduced freeze-thaw effects, and superior crack control.

14 Claims, No Drawings

SEAMIX: BASALT AND GRAPHENE INFUSED CONCRETE ADMIXTURE FOR PREPARING CEMENTITIOUS COMPOSITION WITH NON-POTABLE WATER

TECHNICAL FIELD

The present application relates to building materials. More specifically, the present application relates to methods for preparing a concrete admixture with basalt fibers, graphene, and silica fume, which when added to cement can be used to prepare a cementitious composition or cement-based structure using any type of water, including potable water, freshwater, saltwater, brackish water, reclaimed water or any non-potable water.

BACKGROUND OF THE INVENTION

Concrete is made up of two components, aggregates and paste. Aggregates are generally classified into two groups, fine and coarse, and occupy about 60 to 80 percent of the volume of concrete. The paste is composed of cement, water, and entrained air and ordinarily constitutes 20 to 40 percent of the total volume. Cement is a hydraulic binder composed essentially of silicates and aluminates in variable proportions depending on the raw materials used. The essential raw materials are limestone and clay. In properly made concrete, the aggregate should consist of particles having adequate strength and weather resistance and should not contain materials having injurious effects. A well graded aggregate with low void content is desired for efficient use of paste. The quality of the concrete is greatly dependent upon the quality of paste, which in turn, is dependent upon the ratio of water to cement content used, and the extent of curing. The cement and water combine chemically in a reaction, called hydration, which takes place very rapidly at first and then more and more slowly for a long period of time in favorable moisture conditions. More water is used in mixing concrete than is required for complete hydration of the cement. This is required to make the concrete plastic and more workable; however, as the paste is thinned with water, its quality is lowered, it has less strength, and it is less resistant to weather. For quality concrete, a proper proportion of water to cement is essential.

The raw materials used in the manufacturing of Portland cement consist of combinations of limestone, marl or oyster shells, shale, clay and iron ore. The raw materials must contain appropriate proportions of lime, silica, alumina, and iron components. Selected raw materials are pulverized and proportioned in such a way that the resulting mixture has the desired chemical composition. This is done in a dry process by grinding and blending dry materials, or in a wet process by utilizing a wet slurry. Portland Cement is hydraulic, since it sets and hardens to form a stone-like mass by reacting with water. Basically, Hydraulic Cements may be considered as being composed of the following compounds: Tricalcium Silicate $3CaO.S_1O_2=C_3S$; Dicalcium Silicate $2CaO.S_1O_2=C_2S$; Tricalcium Aluminate $3CaO.Al_2O_3=C_3A$; and Tetracalcium Aluminoferrite $4CaO.Al_2O_3.Fe_2O_3=C_4AF$.

Cement, usually in powder form, acts as a binding agent when mixed with water and aggregates. With typical concrete, almost any natural water that is drinkable is satisfactory as mixing water for making or curing concrete. The acceptance of acidic or alkaline waters is based on the pH scale which ranges from 0 to 14. The pH of neutral water is 7.0. A pH below 7.0 indicates acidity, and a pH above 7.0 indicates alkalinity. The pH of mixing water should be between 4.5 and 8.5. Historically, water containing inorganic salts such as manganese, tin, zinc, copper or lead should not be used for making concrete. Aggregates must conform to certain requirements and should consist of clean, hard, strong, and durable particles free of chemicals, coatings of clay, or other fine materials that may affect the hydration and bond of the cement paste. The characteristics of the aggregates influence the properties of the concrete. Admixtures include all materials other than cement, water and aggregates that are added to concrete. Accelerating admixtures are added to concrete to reduce the setting time of the concrete and to accelerate early strength. The amount of reduction in setting time varies depending on the amount of accelerator used. Calcium chloride is a low-cost accelerator, but it is not recommended for use in concrete with steel reinforcement. Once reinforcing steel comes in contact with saltwater, it begins to corrode. This corrosion causes the steel to expand and consequently breakup the surrounding concrete. To combat this problem, fiber-reinforced polymers (FRP) can be used for reinforcing, in place of steel.

An FRP is the general term for a composite material comprising a polymer matrix reinforced with fibers in the form of fabric, mat, strands, or any other fiber form. FRP materials are composite materials that typically consist of strong fibers embedded in a resin matrix. The fibers provide strength and stiffness to the composite and generally carry most of the applied loads. The matrix acts to bond and protect the fibers and to provide for transfer of stress from fiber to fiber through shear stresses. The most common fibers are glass, carbon, and synthetic fibers. FRP composites have very high strength characteristics and are nonconductive, noncorrosive, and lightweight.

Graphene is a two-dimensional matrix of carbon atoms, arranged in a honeycomb lattice. A single square-meter sheet of graphene would weigh just 0.0077 grams but could support up to four kilograms. Graphene is thin and lightweight but also incredibly strong. It has a large surface area, great heat and electricity conductivity, and is generally renowned for its superior mechanical, thermal, electrical, and ballistic properties, which are due to the enhancement of interfacial adhesion caused by graphene oxide (GO) coating. Graphene-based materials, such as nanographene (NG), exfoliated graphene/graphite nanoplatelet (GNP), graphene oxide (GO) and reduced graphene oxide (rGO), as well as other carbon-based nanomaterials, such as carbon nanotube (CNT), can effectively be used to reinforce polymer composites. Graphene nanoplatelets with an average thickness of the 5-10 nanometers are offered in varying sizes up to 50 microns. These nanoparticles are comprised of short stacks of platelet-shaped graphene sheets that are identical to those found in the walls of carbon nanotubes, but in a planar form. Hydrogen or covalent bonding capability can be added through functionalization at sites on the edges of the platelets. Graphene nanoplatelets are 6-8 nm thick with a bulk density of 0.03 to 0.1 g/cc, an oxygen content of <1% and a carbon content of >99.5 wt % and a residual acid content of <0.5 wt %, and are offered as black granules. Graphene nanoplatelet aggregates are aggregates of sub-micron platelets with a diameter of <2 microns and a thickness of a few nanometers, a bulk density of 0.2 to 0.4 g/cc, an oxygen content of <2 wt % and a carbon content of >98 wt %, and are offered as black granules or black powder. Using graphene nanoplatelets and/or graphene oxide neutralizes the oxidation process even in acidic or highly alkaline environments.

Curing plays an important role on strength development and durability of concrete. Curing takes place immediately after concrete placing and finishing, and involves maintenance of desired moisture and temperature conditions, both at depth and near the surface, for extended periods of time. Properly cured concrete has an adequate amount of moisture for continued hydration and development of strength, volume stability, resistance to freezing and thawing, and abrasion and scaling resistance. Concrete has an excellent structural performance and durability, but early deterioration can occur when subjected to certain environments. The most common cause of deterioration is corrosion of the steel reinforcement, with subsequent sapling of concrete. The durability of concrete is defined as its ability to resist the effects and influences of the environment, while still performing its desired function. (Hoff, G. "Durability of offshore and marine concrete structures." 2nd international conference (ACI SP-127), Montreal, Canada. Farmington Hills, Mich.: American Concrete Institute. pp 0.33-64).

The chemical deterioration of concrete subjected to seawater has long been a topic of interest to concrete researchers. The accepted and conventional belief is that concrete formed by seawater is inferior to that formed through water lacking significant salt. (Kumar, S. 2000. "Influence of water quality on the strength of plain and blended cement concretes in marine environments." *Cement and Concrete Research*, 30(3): 345-350). The primary chemical constituents of seawater are the ions of chloride, sodium, magnesium, calcium and potassium. In seawater containing up to 35,000 ppm of dissolved salts, sodium chloride (NaCl) is by far the predominant salt (about 88% by weight of salts (McCoy, W. J. Mixing and curing water for concrete. *Significance of tests and properties of concrete and concrete-making materials*, STP 169-A. pp. 515-521. Philadelphia, Pa.: American Society for Testing and Materials)). The pH value of seawater varies between 7.4 and 8.4. Corrosion of reinforcing steel occurs below a pH of 11. Therefore, in cases where concrete is subjected to a highly severe environment, the cement must supply alkalinity (Gani, M. S. J. 1997. *Cement and concrete*. 1st ed, 49-169. England: Chapman and Hills).

A number of studies have shown the effects of the mixing and curing of seawater on the compressive strength of cement-sand mortars and corresponding concrete. Research indicates that seawater is not suitable for the mixing and curing of both plain and reinforced concrete in marine conditions (Akinkurolere, O. O., Jiang, C. and Shobola, O. M. 2007. The influence of saltwater on the compressive strength of concrete. *Journal of Engineering Applied Science*, 2(2): 412-415). However, concrete made with the seawater may have a higher early strength than normal concrete and the reduction in strength with age can be compensated by reducing the water-cement ratio and that the microstructural examination of concrete detected chloroaluminate salts in some cracks (Shayan, A. 2010. Effects of sea water on AAR expansion of concrete. *Cement and Concrete Research*, 40(4): 563-568).

The "Effect of Seawater for Mixing and Curing on Structural Concrete" an article published by Falah Wegian in 2010, describes a study that was conducted on the effects of mixing and curing concrete with seawater on the compressive, tensile, flexural and bond strengths of concrete. Concrete mixes were prepared by varying coarse aggregates, cement proportions and types. Six groups of concrete mixes were mixed and cured in fresh water, six groups were mixed and cured in seawater, while four groups were mixed with fresh water and cured in seawater. The study determined that a definite decrease in respective strengths after 28 days and up to 90 days. The reduction in strength increases with an increase in exposure time, which may be due to salt crystallization formation affecting the strength gain. These effects result from the absorption rates of binding materials and other chemical reactions resulting in the diminution of concrete strength (typically, compression strength) over time. The results show that for concrete mixes mixed and cured in seawater, the percentage increase of the compressive strengths range from 14 to 31% in cement content mixes of 350 kg/m$^3$, from 5 to 23% at 400 kg/m$^3$ and from 4 to 17% for 450 kg/m$^3$. This suggests that aggregates should have a good grading and must be resistant against strong chloride solutions and alkali aggregate reactions since deleterious aggregates can react to the penetrating salt ions if the paste does not provide protection against the diffusion of chlorides and the alkali aggregate reaction.

A number of significant factors are involved in mixing concrete and achieving the necessary material properties for a construction project. Although concrete is a common building substance, there is a bit of an "art" involved in the underlying science. In other words, concrete is an aggregate of divergent materials whose combination has significant variance in the resulting properties. A crucial factor of ready-mix concrete is its required compressive strength. Typically, reinforced concrete ranging between 2,500 to 7,000 psi is used on footing and slabs on grade; between 3,500 to 8,000 psi on suspended slabs, beams and girders; and walls and columns normally require between 3,000 to 6,000 psi. When non-reinforced concrete is used, different strengths will be required. If you are using it on footings and walls, a concrete strength of 2,500 psi could be enough, while between 4,000 to 5,000 psi is needed for pavements. Outdoor concrete used on home improvements should be ordered with a strength ranging from 3,500 to 4,500 psi. Ultra-High Performance Concrete (UHPC) is used for specialized applications where high compressive strength over 17,000 psi and a flexural modulus of over 3.5 msi are desired.

Conventional concrete aggregates are often utilized and mixed, with the maximum coarse aggregate being specified when ordering ready-mix concrete. If a larger coarse aggregate is used in a cross-section where the steel ratio is high, then big problems due to honeycombing can result. The maximum size coarse aggregate ordered must be determined by the American Concrete Institute Standard (ACI) and depends on the spacing of reinforcing steel inside form dimensions and available aggregates. Conventionally, maximum aggregate does not exceed ⅕ the narrowest inside form dimension and is not greater than ¾ the spacing between rebars.

Concrete is a mixture of cementitious material, aggregate, and water. Aggregate is commonly considered inert filler, which accounts for 60 to 80 percent of the volume and 70 to 85 percent of the weight of concrete. Although aggregate is considered inert filler, it is a necessary component that defines the concrete's thermal and elastic properties and dimensional stability. Aggregate is classified as two different types, coarse and fine. Coarse aggregate is usually greater than 4.75 mm (retained on a No. 4 sieve), while fine aggregate is less than 4.75 mm (passing the No. 4 sieve). The compressive aggregate strength is an important factor in the selection of aggregate. When determining the strength of normal concrete, most concrete aggregates are several times stronger than the other components in concrete and therefore not a factor in the strength of normal strength concrete.

Lightweight aggregate concrete may be more influenced by the compressive strength of the aggregates.

Other physical and mineralogical properties of aggregate must be known before mixing concrete to obtain a desirable mixture. These properties include shape and texture, size gradation, moisture content, specific gravity, reactivity, soundness and bulk unit weight. These properties along with the water/cementitious material ratio determine the strength, workability, and durability of concrete.

The shape and texture of aggregate affects the properties of fresh concrete more than hardened concrete. Concrete is more workable when smooth and rounded aggregate is used instead of rough angular or elongated aggregate. Most natural sands and gravel from riverbeds or seashores are smooth and rounded and are excellent aggregates. Crushed stone produces much more angular and elongated aggregates, which have a higher surface-to-volume ratio, better bond characteristics but require more cement paste to produce a workable mixture. The surface texture of aggregate can be either smooth or rough. A smooth surface can improve workability, yet a rougher surface generates a stronger bond between the paste and the aggregate creating a higher strength.

The grading or size distribution of aggregate is an important characteristic because it determines the paste requirement for workable concrete. This paste requirement is the factor controlling the cost, since cement is the most expensive component. It is therefore desirable to minimize the amount of paste consistent with the production of concrete that can be handled, compacted, and finished while providing the necessary strength and durability. The required amount of cement paste is dependent upon the amount of void space that must be filled and the total surface area that must be covered. When the particles are of uniform size the spacing is the greatest, but when a range of sizes is used the void spaces are filled and the paste requirement is lowered. The more these voids are filled, the less workable the concrete becomes, therefore, a compromise between workability and economy is necessary.

The moisture content of an aggregate is an important factor when developing the proper water/cementitious material ratio. All aggregates contain some moisture based on the porosity of the particles and the moisture condition of the storage area. The moisture content can range from less than one percent in gravel to up to 40 percent in very porous sandstone and expanded shale. Aggregate can be found in four different moisture states that include oven-dry (OD), air-dry (AD), saturated-surface dry (SSD) and wet. Of these four states, only OD and SSD correspond to a specific moisture state and can be used as reference states for calculating moisture content. In order to calculate the quantity of water that aggregate will either add or subtract to the paste, the following three quantities must be calculated: absorption capacity, effective absorption, and surface moisture.

Most stockpiled coarse aggregate is in the AD state with an absorption of less than one percent, but most fine aggregate is often in the wet state with surface moisture up to five percent. This surface moisture on the fine aggregate creates a thick film over the surface of the particles pushing them apart and increasing the apparent volume. This is commonly known as bulking and can cause significant errors in proportioning volume.

The density of the aggregates is required in mixture proportioning to establish weight-volume relationships. Specific gravity is easily calculated by determining the densities by the displacement of water. All aggregates contain some porosity, and the specific gravity value depends on whether these pores are included in the measurement. There are two terms that are used to distinguish this measurement; absolute specific gravity and bulk specific gravity. Absolute specific gravity (ASG) refers to the solid material excluding the pores, and bulk specific gravity (BSG), sometimes called apparent specific gravity, includes the volume of the pores. For the purpose of mixture proportioning, it is important to know the space occupied by the aggregate particles, including the pores within the particles. The BSG of an aggregate is not directly related to its performance in concrete, although, the specification of BSG is often done to meet minimum density requirements.

For mixture proportioning, the bulk unit weight (a.k.a. bulk density) is required. The bulk density measures the volume that the graded aggregate will occupy in concrete, including the solid aggregate particles and the voids between them. Since the weight of the aggregate is dependent on the moisture content of the aggregate, a constant moisture content is required. This is achieved by using OD aggregate. Additionally, the bulk density is required for the volume method of mixture proportioning.

The most common classification of aggregates on the basis of bulk specific gravity is lightweight, normal-weight, and heavyweight aggregates. In normal concrete the aggregate weighs 1,520-1,680 kg/m$^3$, but occasionally designs require either lightweight or heavyweight concrete. Lightweight concrete contains aggregate that is natural or synthetic which weighs less than 1,100 kg/m$^3$ and heavyweight concrete contains aggregates that are natural or synthetic which weigh more than 2080 kg/m$^3$.

Although aggregates are most commonly known to be inert filler in concrete, the different properties of aggregate have a large impact on the strength, durability, workability, and economy of concrete. These different properties of aggregate allow designers and contractors the most flexibility to meet their design and construction requirements.

There is an increasing need in the world to mitigate against environmentally adverse activities, such as minimizing a carbon footprint resulting from industrial processes. Making cement—the mineral compound that constitutes the most crucial ingredient of concrete—is an extremely carbon-intensive process. It is produced in factories with massive kilns where raw materials, like limestone, clay, and shale, are heated to temperatures up to 1550 degrees Celsius, then ground into a powder. Heating the cement minerals to such high temperatures poses a sustainability concern, says Kemal Celik, professor of civil engineering at New York University Abu Dhabi and the director of the Advanced Materials and Building Efficiency Research (AMBER) Laboratory. Producing cement accounts for around 8% of global CO2 emissions. This fact, Celik says, got him interested in finding a better way to make the material. He and his team already knew that magnesium oxide, a mineral found in salt deposits like lakes and salt flats, could be converted into a type of cement. Celik and his team realized that they could tap the over 70 operating desalination plants for access to brine left over from the process of purifying seawater, which would otherwise just be dumped back into the Gulf. Synthesizing the magnesium oxide in brine into a cement-like substance requires much less heat than making ordinary cement. As magnesium oxide cement hardens over its lifetime, it absorbs carbon dioxide over time to gain strength, potentially making it a carbon-negative building material. The utilization of the materials of this disclosure, while not dependent on the magnesium oxide in brine detailed above, would not only result in more efficient cement formation, which has superior compression strength to conventional cement, but also results in a lower carbon footprint resolving problems inherent in conventional cement production.

Basalt is a hard, dense volcanic igneous rock that can be found in most countries across the globe. For many years, basalt has been used in casting processes to make tiles and slabs for architectural applications. Additionally, cast basalt liners for steel tubing exhibit very high abrasion resistance in industrial applications. In crushed form, basalt also finds use as aggregate in concrete. Crushed basalt aggregates are dense fine-grained rocks that are of very dark color, green or black, and are formed when molten lava from deep in the earth's crust rises up and solidifies. Basaltic rock aggregates are similar to limestone aggregates in many aspects. The basalt aggregates (compared to limestone aggregates), are higher in specific gravity, and lower in absorption and abrasion loss values. When basalt is combined with other hydraulic binders such as cement, non-potable water (as opposed to desalinated water) can be used to produce concrete.

Concrete formed utilizing the Seamix admixture minimizes costs and reduces carbon emissions as compared with preparing conventional concrete. Concrete formed utilizing the Seamix admixture is particularly advantageous for structures built near salt and brackish water sources, because since they are inherently resistant (immune) to the degradation effects of saltwater, they are more sustainable over time than comparable structures built using conventional concrete. And because the graphene basalt-based mix acts as an anti-corrosive slush, neutralizing the rusting effects of steel, Seamix infused concrete can be reinforced with Fiber Reinforced Polymers (FRP) structures, such as basalt-based rebar, to ensure the rust deterioration effects present in using steel rebar (and even the more expensive powdered rebar) are avoided.

Benefits of the reinforced concrete include ease of placement; high early strength; high modulus of elasticity; high-strength and volume stability; high abrasion resistance; low permeability and diffusion; high durability and long-life in severe environments; inhibition of bacterial and mold growth; compaction without segregation; resistance to chemical attack; toughness and impact resistance; lower carbon footprint providing LEED points; and high resistance to frost and deicer scaling damage. Seamix offers construction savings; resistance to alkali corrosion and acids; best weight-strength ratio; lowest carbon footprint; it is marine friendly; non-toxic and can be used with saltwater Eliminating the chloride content of cement lowers cement costs, while using recycled or contaminated aggregates lowers the cost of aggregates. Seamix can potentially reduce the carbon footprint of the concrete industry by 20% and lower cement costs by 30%. Seamix reutilizes 70% of construction and demolition waste, and effectively doubles the lifespan of concrete reinforced structures, and because less concrete is required when combined with the Seamix admixture, construction costs can be reduced nearly in half. Additionally, the reduced manufacturing carbon footprint results in monetizable carbon credits for developers and/or architects, and the use of saltwater or other non-potable sources reduces the use of fresh water aiding in conservation efforts. In combination with non-corrosive basalt fiber reinforced polymers, Seamix, is ideal for tunnels, bridges, seawalls, tall buildings, and parking garages, among others.

SUMMARY OF THE INVENTION

The present invention discloses an admixture, referred to as Seamix, that when added to cement can produce concrete utilizing any type of water, whether potable or non-potable water, said admixture comprised of basalt fibers, silicone carbide, silica fume and graphene infused resins that simulate polypropylene. Concrete prepared with the Seamix admixture not only has superior compression strength to that of conventional concrete, it is also non-toxic, marine friendly, resistant to alkali corrosion, and neutralizes the rusting effects of steel.

In some embodiments, the composition formed by combining the Seamix admixture with cement and non-potable water, upon setting and hardening has a compressive strength greater than 3000 psi in 3 days.

In some embodiments, the composition formed by combining the Seamix admixture with cement and non-potable water, upon setting and hardening has a compressive strength greater than 3500 psi in 3 days.

In some embodiments, the composition formed by combining the Seamix admixture with cement and non-potable water, upon setting and hardening has a compressive strength greater than 4400 psi in 3 days.

In some embodiments, the composition formed by combining the Seamix admixture with cement and non-potable water, upon setting and hardening has a compressive strength greater than 5000 psi in 3 days.

In some embodiments, the composition formed by combining the Seamix admixture with cement and non-potable water, upon setting and hardening has a compressive strength greater than 2800 psi in 7 days.

In some embodiments, the composition formed by combining the Seamix admixture with cement and non-potable water, upon setting and hardening has a compressive strength greater than 5600 psi in 7 days.

In some embodiments, the composition formed by combining the Seamix admixture with cement and non-potable water, upon setting and hardening has a compressive strength greater than 4000 psi in 9 days.

In some embodiments, the composition formed by combining the Seamix admixture with cement and non-potable water, upon setting and hardening has a compressive strength greater than 4500 psi in 9 days.

In some embodiments, the composition formed by combining the Seamix admixture with cement and non-potable water, upon setting and hardening has a compressive strength greater than 5000 psi in 9 days.

In some embodiments, the composition formed by combining the Seamix admixture with cement and non-potable water, upon setting and hardening has a compressive strength greater than 5400 psi in 16 days.

In some embodiments, the composition formed by combining the Seamix admixture with cement and non-potable water, upon setting and hardening has a compressive strength greater than 3000 psi in 28 days.

In some embodiments, the composition formed by combining the Seamix admixture with cement and non-potable water, upon setting and hardening has a compressive strength greater than 4000 psi in 28 days.

In some embodiments, the composition formed by combining the Seamix admixture with cement and non-potable water, upon setting and hardening has a compressive strength greater than 7000 psi in 28 days.

In some embodiments, the composition formed by combining the Seamix admixture with cement and non-potable water, upon setting and hardening has a compressive strength greater than 9000 psi in 28 days.

In some embodiments, the amount of cement used is reduced in equal amounts of the amount of Seamix admixture added.

In some embodiments, the water combined with the Seamix admixture and cement to form concrete comprises saltwater.

In some embodiments, the water combined with the Seamix admixture and cement to form concrete comprises brackish water.

In some embodiments, the water combined with the Seamix admixture and cement to form concrete comprises reclaimed water.

In some embodiments, the water combined with the Seamix admixture and cement to form concrete comprises non-potable water.

In some embodiments, the water combined with the Seamix admixture and cement to form concrete comprises potable water.

In some embodiments, the composition formed by combining the Seamix admixture with cement increases the overall strength of the cement design mix by 30%.

In some embodiments, the composition formed by combining the Seamix admixture with cement increases the overall strength of the cement design mix by 150%.

In some embodiments, the composition formed by replacing the calcium chloride in the Seamix admixture with silica fume, reducing the amount of cement used, and adding coarse and fine aggregates produces a design mix with the overall strength specified to attain a minimum ASTM standard for Ultra High Performance Concrete, compressive strength of at least 120 MPa (17 000 psi), with nominal maximum size aggregate of less than 5 mm [¼ in.] and a flow between 200 and 250 mm [8 and 10 in.].

DETAILED DESCRIPTION OF THE DISCLOSURE

Embodiments of the present invention will now be described by way of example with reference to the following Examples.

Example 1

An admixture is prepared consisting of two systems of fibers, Fiber System I and Fiber System II, where Fiber System I is 20% of the total volume of the admixture, and Fiber System II is 80% of the total volume of the admixture. Fiber System I is prepared by mixing chopped basalt fibers coated with silane (9.734% of the total volume of Fiber System I), graphene nanoplatelets under 10 microns in size (1.027% of the total volume of Fiber System I), calcium sulfide (2.053% of the total volume of Fiber System I), calcium chloride (2.053% of the total volume of Fiber System I), magnesium oxide (2.053% of the total volume of Fiber System I) and nanoclay (3.080% of the total volume of Fiber System I). The particulates of Fiber System I are combined in an auger mixer. The tumbled Fiber System I is blended with Fiber System II, which consists of chopped basalt fibers coated with silane. A cementitious composition was prepared by adding the admixture to Ready Mixed concrete mix prepared according to the package specifications but using non-potable water as the aqueous medium.

Whereas a cementitious composition was prepared using the Ready Mixed concrete according to the package specifications without the admixture, after 28 days the sample had a compressive strength of 3000 PSI. A cementitious composition prepared using the admixture had a compressive strength of 4460 PSI at the same age. The Seamix treated concrete showed increased compression, workability, and a resistance to corrosion. The overall strength of the design mix was increased by 30%, with an increased durability in freeze-thaw cycles, and reduction in the water to cement ratio.

Example 2

An admixture is prepared consisting of three systems of fibers, Fiber System I, Fiber System II, and Fiber System III, where Fiber System I is 20% of the total volume of the admixture, Fiber System II is 10% of the total volume of the admixture, and Fiber System III is 70% of the total volume of the admixture. Fiber System I is prepared by mixing chopped basalt fibers coated with silane (8.708% of the total volume of Fiber System I), graphene nanoplatelets under 10 microns in size (2.053 w % of the total volume of Fiber System I), calcium sulfide (2.053% of the total volume of Fiber System I), calcium chloride (2.053% of the total volume of Fiber System I), magnesium oxide (2.053% of the total volume of Fiber System I) and nanoclay (3.080% of the total volume of Fiber System I). The particulates of Fiber System I are combined in an auger mixer. Fiber System II is prepared with chopped basalt fibers coated with silane and cured with bisphenol-A epoxy, where the chopped basalt fibers are 50 mm in size. Fiber System III consists of chopped basalt fibers coated with silane. The tumbled Fiber System I, cured Fiber System II, and Fiber System III are combined. A cementitious composition was prepared by adding the admixture to Ready Mixed concrete mix prepared according to the package specifications but using non-potable water as the aqueous medium.

Whereas a cementitious composition was prepared using the Ready Mixed concrete according to the package specifications without the admixture, after 28 days the sample had a compressive strength of 5000 PSI. A cementitious composition prepared using the admixture had a compressive strength of 7120 PSI at the same age. The resulting concrete showed increased compression, workability, resistance to corrosion. The overall strength of the design mix was increased by 150%.

Example 3

A concrete mix is prepared consisting of 18.0% Portland cement, 27% coarse aggregate, 25% fine aggregate; 19.5% non-potable water, 0.5% graphene nanoplatelets under ten microns in size, 1.5% silica fume, 0.5% magnesium oxide, 0.5% calcium sulfide, and three systems of fibers, Fiber System I, Fiber System II, and Fiber System III, where each Fiber System is 2.5% of the total volume concrete mix. Fiber System I is prepared by coating basalt fibers with silane, where the fibers are each 24 mm in size. Fiber System II is prepared by coating basalt fibers with silane, where the fibers are each 3 mm in size. Fiber System III is prepared by coating basalt fibers with silane and curing the fibers with bisphenol-A epoxy, where the chopped basalt fibers are each 50 mm in size. Fiber System III consists of chopped basalt fibers coated with silane. A cementitious composition was prepared from the concrete mix. The resulting concrete exhibited increased compression, workability, resistance to corrosion, and the overall compressive strength attained was 17,000 PSI—the minimum ASTM standard for Ultra High Performance Concrete.

The invention claimed is:

1. A concrete admixture comprising:
Fiber System I; and
Fiber System II;
wherein Fiber System II comprising:

chopped basalt fibers coated with silane;
wherein Fiber System II comprises 80.000% of the total volume of the admixture;
wherein Fiber System I comprising:
chopped basalt fibers coated with silane (9.734% of the total volume of Fiber System I);
graphene nanoplatelets under 10 microns in size (1.027% of the total volume of Fiber System I);
calcium sulfide (2.053% of the total volume of Fiber System I);
calcium chloride (2.053% of the total volume of Fiber System I);
magnesium oxide (2.053% of the total volume of Fiber System I); and
nanoclay (3.080% of the total volume of Fiber System I);
wherein Fiber System I comprises 20.000% of the total volume of the admixture.

2. A concrete admixture comprising:
Fiber System I;
Fiber System II; and
Fiber System III;
wherein Fiber System III comprising:
chopped basalt fibers coated with silane;
wherein Fiber System III comprises 70.000% of the total volume of the admixture;
wherein Fiber System I comprising:
chopped basalt fibers coated with silane (8.708% of the total volume of Fiber System I);
graphene nanoplatelets under 10 microns in size (2.053% of the total volume of Fiber System I),
calcium sulfide (2.053% of the total volume of Fiber System I);
calcium chloride (2.053% of the total volume of Fiber System I);
magnesium oxide (2.053% of the total volume of Fiber System I); and
nanoclay (3.080% of the total volume of Fiber System I);
wherein Fiber System I comprises 20.000% of the total volume of the admixture;
wherein Fiber System II comprising:
chopped basalt fibers coated with silane;
wherein the fibers are 50 mm in size;
wherein the fibers are cured with bisphenol-A epoxy;
wherein Fiber System II comprises 10.000% of the total volume of the admixture.

3. A concrete mix comprising:
18.0% Portland cement;
27% coarse aggregate;
25% fine aggregate;
19.5% water;
0.5% graphene nanoplatelets;
1.5% silica fume;
0.5% magnesium oxide;
0.5% calcium sulfide;
Fiber System I;
wherein Fiber System I comprising:
chopped basalt fibers coated with silane;
wherein the fibers are 24 mm in size;
wherein Fiber System I comprises 2.5% of the total volume of the concrete mix;
Fiber System II;
wherein Fiber System II comprising:
chopped basalt fibers coated with silane;
wherein the fibers are 3 mm in size;
wherein Fiber System II comprises 2.5% of the total volume of the concrete mix;
Fiber System III;
wherein Fiber System III comprising:
chopped basalt fibers coated with silane;
wherein the fibers are 50 mm in size;
wherein the fibers are cured with bisphenol-A epoxy; and
wherein Fiber System III comprises 2.5% of the total volume of the concrete mix.

4. A cement mixture wherein the concrete admixture of any of the claims 1 or 2, is mixed with cement.

5. The concrete mix of claim 3 wherein the cement is Type 1 or Type 2 Portland cement.

6. A cementitious composition comprised of cement, the concrete admixture of any of the claims 1 or 2, and non-potable water with salinity of 30,000-40,000 mg/L.

7. A cementitious composition comprised of cement, the concrete admixture of any of the claims 1 or 2, and non-potable water with salinity of 500-17,000 mg/L.

8. A cementitious composition comprised of cement, the concrete admixture of any of the claims 1 or 2, and potable water.

9. A cementitious composition comprised of cement, the concrete admixture of any of the claims 1 or 2, and freshwater.

10. A cementitious composition comprised of the concrete mix of claim 3, wherein the water is potable water.

11. A cementitious composition comprised of the concrete mix of claim 3, wherein the water is freshwater.

12. A cementitious composition comprised of the concrete mix of claim 3, wherein the water is non-potable water.

13. A cementitious composition comprised of the concrete mix of claim 3, wherein the water is non-potable water having a salinity of 30,000-40,000 mg/L.

14. A cementitious composition comprised of the concrete mix of claim 3, wherein the water is non-potable water having a salinity of 500-17,000 mg/L.

* * * * *